(12) United States Patent
Sundstrom

(10) Patent No.: US 8,166,117 B2
(45) Date of Patent: Apr. 24, 2012

(54) CONVERTING A TEXT-BASED EMAIL MESSAGE TO AN EMAIL MESSAGE INCLUDING IMAGE-BASED FONTS

(75) Inventor: Martin Sundstrom, Gentofte (DK)

(73) Assignee: International Business Machines Corporation, Armonk, NY (US)

(*) Notice: Subject to any disclaimer, the term of this patent is extended or adjusted under 35 U.S.C. 154(b) by 852 days.

(21) Appl. No.: 11/867,050

(22) Filed: Oct. 4, 2007

(65) Prior Publication Data
US 2008/0091784 A1 Apr. 17, 2008

(30) Foreign Application Priority Data
Oct. 12, 2006 (GB) .................................. 0620238.6

(51) Int. Cl.
G06F 15/16 (2006.01)
(52) U.S. Cl. ...................................................... 709/206
(58) Field of Classification Search .................... 709/206
See application file for complete search history.

(56) References Cited

U.S. PATENT DOCUMENTS

| 5,081,594 | A | * | 1/1992 | Horsley | 345/467 |
| 5,519,824 | A | * | 5/1996 | Lizzi | 345/170 |
| 5,577,177 | A | * | 11/1996 | Collins et al. | 345/469 |
| 5,781,714 | A | * | 7/1998 | Collins et al. | 345/471 |
| 6,446,115 | B2 | * | 9/2002 | Powers | 709/206 |
| 6,519,630 | B1 | * | 2/2003 | Hanawa | 709/206 |
| 7,038,794 | B2 | * | 5/2006 | Kurashina | 358/1.11 |
| 7,089,494 | B1 | * | 8/2006 | Burrell | 715/207 |
| 7,424,676 | B1 | * | 9/2008 | Carlson et al. | 715/273 |
| 7,538,771 | B2 | * | 5/2009 | Nakamura et al. | 345/467 |
| 7,570,374 | B2 | * | 8/2009 | Kawara | 358/1.11 |
| 2002/0143871 | A1 | * | 10/2002 | Meyer et al. | 709/204 |
| 2004/0109020 | A1 | * | 6/2004 | Song | 345/744 |
| 2004/0145762 | A1 | * | 7/2004 | Kurashina | 358/1.11 |
| 2004/0216047 | A1 | * | 10/2004 | Iwata | 715/530 |
| 2005/0027781 | A1 | * | 2/2005 | Curry et al. | 709/200 |
| 2005/0033814 | A1 | * | 2/2005 | Ota | 709/206 |
| 2005/0055627 | A1 | * | 3/2005 | Lloyd et al. | 715/505 |
| 2005/0147453 | A1 | * | 7/2005 | Ueno et al. | 400/621 |

(Continued)

OTHER PUBLICATIONS

Suzanne Mccarthy, "Character Map Windows XP", Sep. 14, 2005, "ABECEDARIA", p. 1.*

(Continued)

*Primary Examiner* — Firmin Backer
*Assistant Examiner* — Jonathan Bui
(74) *Attorney, Agent, or Firm* — Steven L. Nichols; VanCott, Bagley, Cornwall & McCarthy P.C.

(57) ABSTRACT

An email message is analyzed to identify sections of characters having a common formatting characteristic. Sets of character images are generated for the characters in each section. An analyzed e-mail message is converted from a rich text format to a platform-independent format that specifies the structure of the e-mail message. A set of replacement instructions is generated for use at a message destination. The platform-independent format, the character image sets and the replacement instructions are all transmitted to the destination. At the destination, the message is rendered by using the replacement instructions to replace each character in the message with one of the character images in the character image sets. The message can be displayed at the destination system with the same fonts and font attributes used originally used in creating the message, regardless whether those fonts exist on the destination system.

17 Claims, 5 Drawing Sheets

U.S. PATENT DOCUMENTS

| | | | |
|---|---|---|---|
| 2005/0270553 A1* | 12/2005 | Kawara | 358/1.13 |
| 2006/0026515 A1* | 2/2006 | Balinsky | 715/530 |
| 2006/0072162 A1* | 4/2006 | Nakamura et al. | 358/402 |
| 2006/0190830 A1* | 8/2006 | Gerstl et al. | 715/757 |
| 2006/0224680 A1* | 10/2006 | Terayoko | 709/206 |
| 2007/0043818 A1* | 2/2007 | Cottrille et al. | 709/206 |
| 2007/0229506 A1* | 10/2007 | Sugita et al. | 345/441 |
| 2007/0283047 A1* | 12/2007 | Theis et al. | 709/246 |
| 2008/0216022 A1* | 9/2008 | Lorch et al. | 715/847 |
| 2008/0220873 A1* | 9/2008 | Lee et al. | 463/42 |
| 2008/0280633 A1* | 11/2008 | Agiv | 455/466 |
| 2009/0059310 A1* | 3/2009 | Henry et al. | 358/403 |
| 2009/0063131 A1* | 3/2009 | Soumare | 704/9 |
| 2009/0075681 A1* | 3/2009 | Jager | 455/466 |
| 2009/0276695 A1* | 11/2009 | Hodges et al. | 715/249 |
| 2010/0011076 A1* | 1/2010 | Shkolnikov et al. | 709/206 |

OTHER PUBLICATIONS

IBM TDB, Web Personalization: Method of Combining a Personal Font with Internet Messages:, IPCOM000016152D, Aug. 12, 2002, IP.com Electronic Publication, Jun. 21, 2003.

Stop Design, "Using Background-Image to Replace Text", 1998-2006 Stopdesign, pp. 1-8, Mar. 8, 2006.

\* cited by examiner

CONVERTING A TEXT-BASED EMAIL MESSAGE TO AN EMAIL MESSAGE INCLUDING IMAGE-BASED FONTS

BACKGROUND OF THE INVENTION

The invention relates to the field of messaging systems. In particular, the invention relates to a method and apparatus for converting a text based email message to an image-based email message.

Email messages are rendered and displayed using fonts pre-installed on an operating system. This creates many limitations ranging from users not being able to personalize emails to web designers being limited in the font typefaces that they are able to use when designing web pages. To explain further, when creating an email message a user may be unable to personalize the email message to any great extent because the user is limited to the fonts pre-installed on his or her computer. Often, the fonts are preinstalled when the operating system is installed on a computer system. As different versions of an operating system are launched onto the market and users upgrade or replace their operating systems, more or fewer fonts may be installed on their computer system—thus creating disparate sets of fonts preinstalled on different users computer systems.

As different users often have different versions of an operating system installed on their computer systems, this creates an environment in which one user may have only small set of preinstalled fonts that are common with another user's pre-installed set of fonts. Thus a problem arises when a user creates an email message with a font typeface that is not installed on the recipient's computer system. When the recipient receives the email message, the recipient's mail client detects that the recipient's mail client does not have the message font preinstalled and renders the email message by substituting an existing font for the font used in the message. Thus, the recipient is unable to benefit from any personalization of the email message by the sender. One solution to this problem is proposed in an article called Web personalization: "Method of combining a personal font with internet messages", IBM TDB, Aug. 12, 2002. The article describes a way in which an embedded font can be specified in HTML using a STYLE sheet element. This allows a font to be specified using a URL where the font is located on a remote server. However, relying on a font that resides on a server has several disadvantages. Firstly, the server may not always be available. Secondly, the font may no longer exist on the server when the recipient tries to read the message and therefore can not be served. Thirdly, a server-based font is not available for use when a user is working off-line.

Another solution is proposed in an article by Stopdesign, published on 7 Mar. 2003. The article proposes using background images for creating headlines and decorative typefaces. However, the solution has a number of drawbacks in that the image file has to be pre-generated and the pre-generated image can often only be used for the scenario in which it was generated for.

BRIEF SUMMARY OF THE INVENTION

The invention may be implemented as an email message generator including a receiving component for receiving a rich text format email message addressed to a user at a destination system and an analysis component for analyzing the email message to identify one or more sections, each section consisting of characters having the same formatting characteristic. A converter component converts the email message from a rich text format to a platform-independent format that specifies the structure of the email message. A generator component generates one or more image sets. Each set includes character images having a single formatting characteristic found in one or more of the identified sections of the received email message. The generator component also generates a set of replacement instructions that are used at the destination system to render the message by replacing each character specified in the platform-independent format with a character image received from one of the image sets.

The invention may also be implemented as a method for generating an email message based on a received rich text format email message addressed to a user at a destination system. The received email message is generated to identify one or more sections, each consisting of characters having the same formatting characteristic. The email message is converted to a platform-independent format specifying the structure of the email message. One or more image sets are generated with each image set comprising character images having a single formatting characteristic found in one or more of the identified message sections. A set of replacement instructions is also generated. The replacement instructions are for use at the destination system in rendering the message by replacing each character specified in the platform-independent format with a character image retrieved from one of the message sets.

Finally, the invention may be implemented as a computer program product for generating an e-mail message. The computer program product includes a computer usable medium computer usable program code, including code configured to receive a rich text format email message addressed to a user at a destination system and code configured to analyze the received message to identify one or sections, each section consisting of characters having the same formatting characteristic. Other code converts the message to a platform-independent format specifying the message structure. Still other code generates one or more image sets, each having character images having a single formatting characteristic found in one or more of the identified sections, and a set of replacement instructions for use at the destination system in rendering the message by replacing each character specified in the platform-independent format with a character image retrieved from one of the image sets.

DETAILED DESCRIPTION OF THE INVENTION

Figure 1:
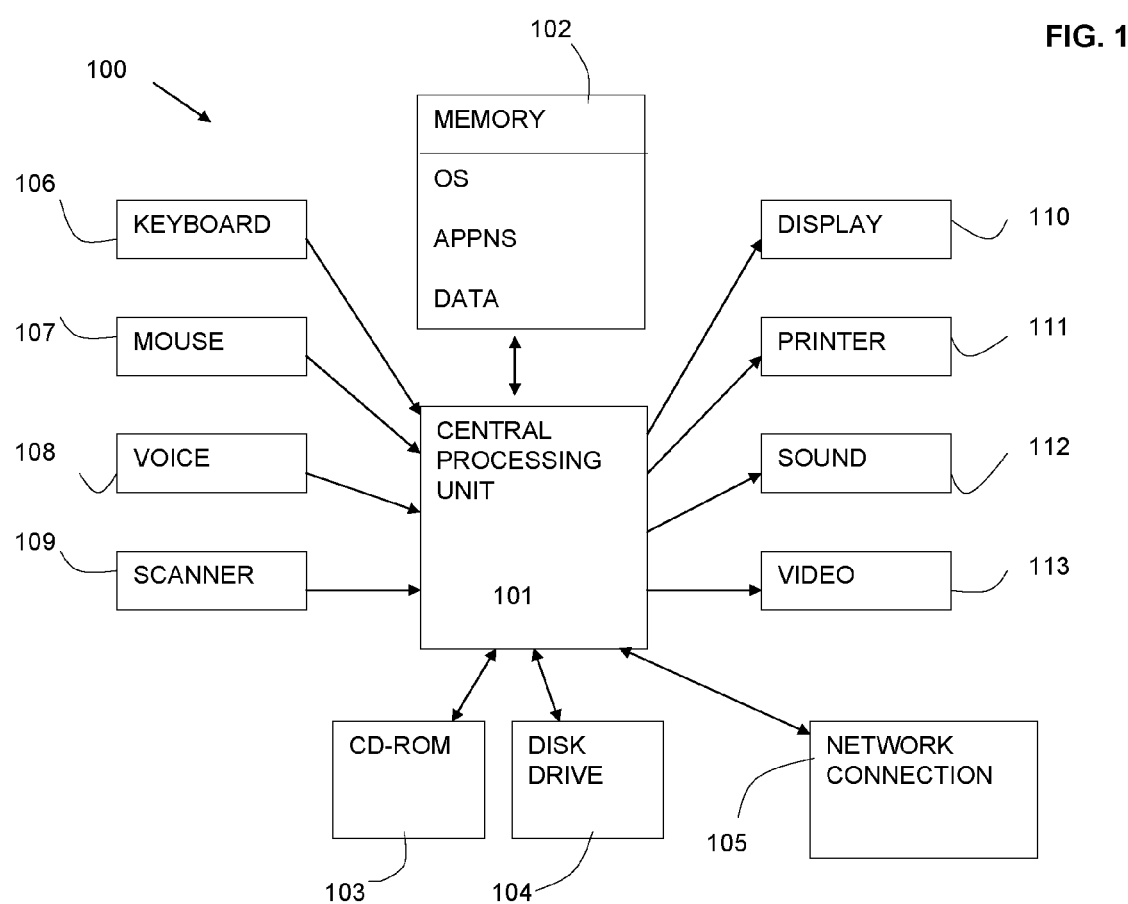
FIG. 1 is a block diagram of a system in which the present invention may be implemented.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, a computer system 100 is shown in which a preferred embodiment of the present invention may be implemented. A computer system 100 has a central processing unit 101 with primary storage in the form of memory 102 (RAM and ROM). The memory 102 stores program information and data acted on or created by the programs. The program information includes the operating system code for the computer system 100 and application code for applications running on the computer system 100. Secondary storage includes optical disk storage 103 and magnetic disk storage 104. Data and program information can also be stored and accessed from the secondary storage.

The computer system 100 includes a network connection 105 for interfacing the computer system 100 to a network such as a local area network (LAN) or the Internet. The computer system 100 may also have other external source communication interfaces such as a fax modem or telephone connection.

The central processing unit 101 can receive inputs from a variety of input devices including, as examples, a keyboard 106, a mouse 107, voice input 108, and a scanner 109 for inputting text, images, graphics or the like. Outputs from the central processing unit 100 may be provided to a display 110, a printer 111, sound output 112, video output 113, etc.

In a distributed system, a computer system 100 as shown in FIG. 1 may be connected via a network connection 105 to a server (not shown) on which applications may be run remotely from the central processing unit 101. In a distributed system, the computer system 100 is typically referred to as a client system.

Applications may run on the computer system 100 from storage components 103, 104 or via a network connection 105 and may include email applications, messaging systems, database applications and other storage and retrieval mechanisms.

Figure 2:
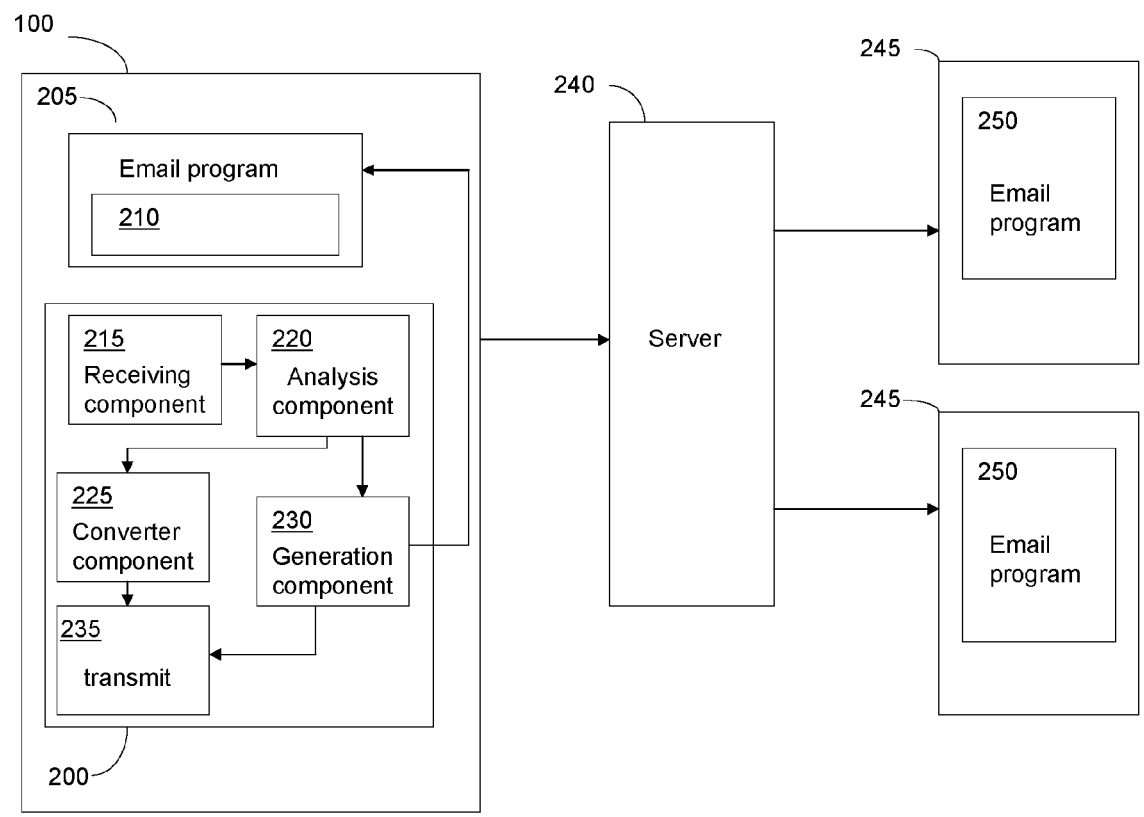
FIG. 2 illustrates the components of the conversion apparatus in accordance with a preferred embodiment of the present invention.

Referring to FIG. 2, a distributed data processing system 100 is shown in which the present invention may be implemented. In order to send an email to another email user, an email application is used. A variety of email applications currently exist with varying degrees of functionality. However, the core functionality of all email systems comprises a text editor 210 for composing email messages. Text editors are typically capable of modifying and personalizing text entered using the text editor. For example when typing in the text 'Hello World'—the text can be changed to Hello World—in bold;

Hello World—in italic;

Hello World—underlined;

Hello World—in a different color; or

Hello World—in a different font and a different size.

Once the user has finished drafting an email message, the user 'sends' the email to a recipient at a destination system. The email message is transmitted across a network which can be a local area network, a wide area network, a wireless network, or a combination of different types of networks. The email message is sent to a mail server 240 that routes the email message to the recipient. It should be understood that the message will typically pass through several servers before reaching the recipient.

As previously explained, a problem occurs when originators and recipients of email do not have the same fonts and typefaces installed on their computer systems. Often a recipient of an email message cannot benefit from the personalization provided by the originator. For example, a recipient of an email message might view 'Hello World' as 'Hello World' and thus not benefit from the sender's intended underlining of the text.

The present invention is an image-based email apparatus 200 for analyzing a sender's email message to understand the formatting of the email message and to convert the sender's email message into an email message which is reconstructed at the destination with individual character images that are identical to the rich text characters and their associated formatting characteristics intended by the originator. The image-based email apparatus 200 also analyzes the layout of the email message, and, using a language such as HTML, formats the image-based email to create the same layout as the original email message. When reconstructing the email message, the image-based email apparatus generates an HTML document that is sent to the recipient along with an image font library. When the recipient receives the email message, the recipient's email client renders the HTML document using a set of replacement instructions included in the email message and displays the email message to the user. The user is able to view the email message in exactly the same format as the sender intended when composing the email message. The character image generator will now be explained in detail.

The image-based email apparatus 200 comprises several components which interface and interact with each other in order to analyze an email massage in order to generate an email message comprising image-based fonts which mirror the formatting and stylization of the original email message. The image-based email apparatus 200 may be provided as an add-on component downloadable from a supplying entity or built-in as part of an existing email application 205.

The image-based email apparatus 200 comprises a receiving component 215, an analysis component 220, a generation component 230, a converter component 225 and a transmitting component 235. Each of these components will now be explained in turn.

The receiving component 215 is configurable for receiving a trigger action from the 'send email' action within the email application 205. That is, when an email message has been composed and is ready to be sent, the user selects the 'send email' button. The receiving component 215 captures and intercepts the email message before it is transmitted across the network to a email server. Alternatively, the receiving component 215 may be activated by selecting an option from a menu bar within the sender's email environment.

The receiving component 215, on receipt of the email message, communicates with the analysis component 220 by instructing the analysis component 220 to process the email message. Processing control then moves from the receiving component 220 to the analysis component 220.

The analysis component 220 begins by parsing the email message to understand how the email message is constructed. For example, what font or fonts are used, how many different font types there are, which and how many font attributes have been used, etc. The analysis component 220 identifies, within the email message, where a new text section begins and ends. A new text section is characterized by a series of characters, breaks and spaces having the same font-color, font-spacing, font-size and font-weight (bold, italic etc). A text section can also include links. For example:

EXAMPLE 1

"Today, the weather is cold, but the sky is blue and the sun is shining. For an up to date weather forecast for your area click here—weather forecast."

Example 1, above, illustrates a portion of text comprising two sentences. The first sentence is assumed to use the Font Arial size 10 and include some stylistic formatting in the form of italics. The second sentence again is assumed to use the Font type Arial but in size 12 and further include a URL link to a web page, the link being formatted in bold. The analysis component parses the text of Example 1 and determines there are six text sections requiring analysis. The text sections are identified as follows:

1. Today, the weather is cold, but the sky is
2. blue
3. and the sun is
4. shining.
5. For an up to date weather forecast for your area click here—
6. —weather forecast.

Thus, the analysis component 220 identifies the start of a new section by identifying a change in character formatting; for example, a change in size, color or attributes.

The analysis component 220 determines that section number one and section number three are of the same font, size and format and that section numbers two and four are of the same font, size and formatting. However, the analysis component 220 also determines section five and six have no similarity to each other or to any of the other identified sections. Based on this analysis the analysis component 220 can categorize the similarities and dissimilarities into individual image sets. For example sections one and three will form one image set including the characters T, o, d, a, y, t, e, h, r, I, s, c, l, b, u, s, k, y, and blank images for spaces between each of the words.

Likewise, sections two and four will include the characters b, l, u, e, s, h, I, n, g and blank images for spaces between each of the words. Section five will include the characters F, o, r, a, n, u, p, t, d, e, w, h, s, c, y, l, k etc. Lastly, section six will include the characters w, e, a, t, h, r, f, o, c, s, etc.

The analysis component 220 also identifies each line break in a text section. For example, a line break is created each time the 'Return' key on the keyboard is selected or the text automatically wraps from one line to the next. In each of these instances, identified line breaks are replaced with an HTML tag <br>.

The analysis component 220 locates, from a data store, the TrueType Font used in the message with its required attributes. A TrueType font is stored in a data store along with other TrueType fonts and can be described as a character map of installed TrueType fonts.

The analysis component 220 determines if there are any hyperlinks present in the email message. If the analysis component 220 determines that there are links present, the analysis component 220 notifies the generation component 230 that an HTML A-element should be generated with the link text section embedded. Finally, the analysis component 220 identifies any non-alphabetic ASCII characters in each of the text sections. The analysis component 220, on gathering all of the above information, generates a table comprising a complete breakdown of the formatting structure of the email message i.e. font types used, the size, color and other attributes.

The table is categorized by image sets—each image set defining an instruction as to which fonts and formatting characteristics are to be generated for each identified text section. For each image set, the formatting table comprises a tally of the number of times in which a character appears in the image set. For example, in order to save on data storage, if the character 'e' appears in the images set six times, the number 6 will be written to the formatting table, however the generator component will only generate the image character once and not six times.

The analysis component 220 transmits the generated formatting table to the converter component 225 for the next step in the process.

Figure 3:
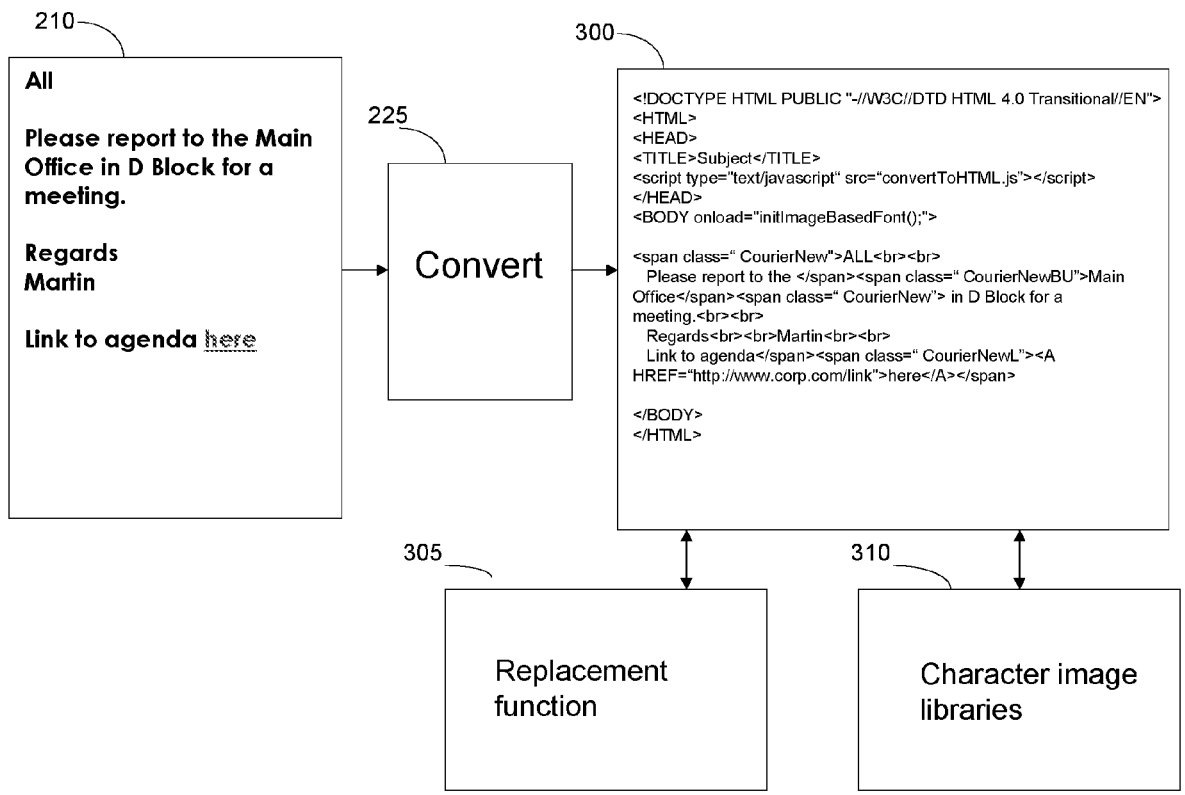
FIG. 3 illustrates the conversion of an email into its image-based equivalent in accordance with a preferred embodiment of the invention.

The converter component 225 performs a lookup operation in the formatting table to determine the mail format of the email message. For example, the format could be SMTP or another MIME type. Once the mail type is determined, the converter component 225 begins to convert the ASCII text of the email message to an HTML format. In order to do this the converter component 225 will generate HTML code that mirrors the layout of the ASCII email message by creating a table in which to structure the layout of the generated images. For each occurrence of the placement of a new text section in the email, the converter component 225 will incorporate an HTML SPAN-element around the new text section and additionally add a class attribute indicating the font type used. All font attributes will be integrated in the images which make up the letters in the text. Special email features such as background color or text arrangement that cannot be controlled with letter images will be controlled with CSS or HTML codes such as TABLE-elements or DIV-elements. This is shown in FIG. 3 where an email message is converted into an HTML document.

On completion of the generation of the HTML code by the converter component 225, the generation component 230 parses the formatting table and generates the character images GIF files by interfacing with a TrueType font library to the requirements as specified in the formatting table. The images may be generated by PHP, Java or some other suitable programming language.

Once each character image is generated for each image set, the generated character image set is placed in a folder in a data store and named via a preferred naming convention. Each generated image set is assigned a unique identifier such that the generator component 230 can 'call' the generated image set within the HTML code. However, even if a letter with the same attributes occurs more than once, only one image of the letter is created thereby minimizing the size of the final mail file.

The generation component 230 also generates a set of replacement instructions that are used at the destination system to replace the text in the HTML email message with character images in the generated character image sets. An example of the replacement instructions is shown below in Example 2:

EXAMPLE 2

```
function doImageBasedFont(fontType,t){
    var ibfString="<nobr>";
    var skip=false;
    var linkDeco="";
    var j=0;
    for (j=0;j<t.length-1;j++){
        if (t.charAt(j)== "<") {ibfString += "<"; skip=true;}
            else if (t.charAt(j)== ">") {ibfString += ">"; skip=false;}
        else if (skip) ibfString += t.charAt(j);
            else if (!skip) {
                if (t.charAt(j)== " ") ibfString += "<img
                src='"+fontType+"/space.gif' border='0'></nobr><nobr>";
                else if (t.charAt(j)== ".") ibfString += "<img
                src='"+fontType+"/per.gif' border='0'>";
                else if (t.charAt(j)==t.charAt(j).toLowerCase( )) ibfString += "<img
                src='"+fontType+"/"+t.charAt(j)+".gif' border='0'>";
                else if (t.charAt(j)==t.charAt(j).toUpperCase( )) ibfString += "<img
                src='"+fontType+"/"+t.charAt(j)+"-uc.gif' border='0'>";
            }
    }
    return ibfString;
}
function initImageBasedFont( ){
    var textBlocks = new Array( );
    textBlocks = document.getElementsByTagName("SPAN");
    for (i=0;i<textBlocks.length;i++){
        if (textBlocks[i].className==" CourierNew")
        {textBlocks[i].innerHTML=doImageBasedFont("
        CourierNew",textBlocks[i].innerHTML);}
        if (textBlocks[i].className==" CourierNewL")
        {textBlocks[i].innerHTML=doImageBasedFont("
        CourierNewL",textBlocks[i].innerHTML);}
        if (textBlocks[i].className==" CourierNewUB")
        {textBlocks[i].innerHTML=doImageBasedFont("
        CourierNewUB",textBlocks[i].innerHTML);}
    }
}
```

The generation component 230 transmits the generated replacement instructions and the generated character image files to the transmit component 235. The converter component 225 also transmits the converted email message, i.e. the HTML email message, to the transmit component for packaging with the replacement instructions and the identified character image sets in order to be sent to the recipient for viewing.

Figure 4:
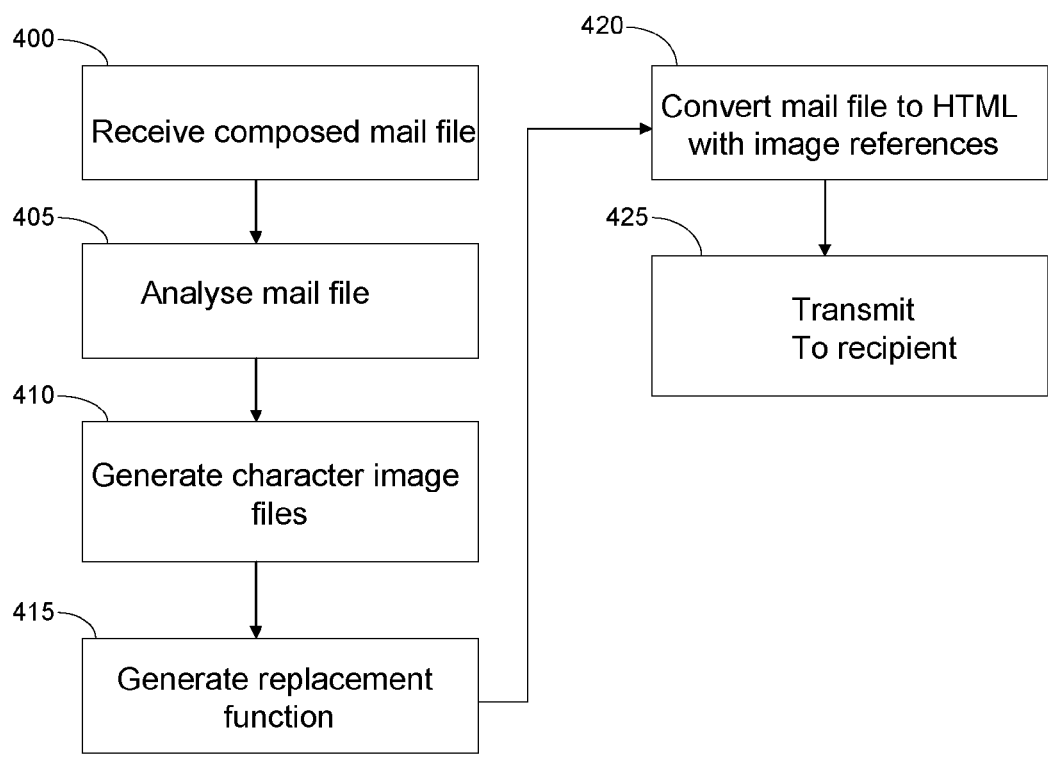
FIG. 4 is a flow chart showing the operational steps of the present invention in accordance with a preferred embodiment of the present invention.

FIG. 3, with reference to FIG. 4, shows an email message being converted from its original rich text format into an HTML format along with the required function calls to a generated character image set and a set of replacement instructions.

A sender of an email message creates an email message (step 400) in a chosen format. In this example, the sender has crafted an email message stating:

---
ALL
Please report to the Main Office in D Block for a meeting
Regards
Martin
Link to agenda here

---

Once the user selects the 'send email' button, the analysis component 220 analyzes the email message to identify each text section and, for each identified text section, the required font type and its associated formatting characteristics, the number of blank images required and the number of line breaks. For example, using the example in FIG. 3, the analysis component 220 determines the number of characters required by determining the lowest common denominator of characters needed and recording the results in a formatting table as follows:

Text Section One
    Font type: Arial
    Characters: A,L,P,l,e,a,s,r,o,t,h,p,h
    Characteristics: uppercase A,L,P; all other characters lower case. Color black.
    Line breaks: 2
    Blank spaces: 4
    Set name: Arial
Text Section Two
    Font type: Arial
    Characters: M,a,i,n,O,f c,e
    Characteristics: uppercase M,O; all other characters lower case. Color black. Font weight Bold and underline decoration. Color black.
    Line breaks: 0
    Blank spaces: 1
    Set name: ArialUB (UB for Underlined Bold)
Text Section Three
    Font type: Arial
    Characters: D,B,l,o,c,k,fr,a,m,e,t,i,n,g,.,R,d,M,L
    Characteristics: uppercase D,B,R,M,L; all other characters lower case. Note also punctuation character needed. Color black.
    Line breaks: 4
    Blank spaces: 10
    Set Name: Arial
Text Section Four
    Font type: Arial
    Characters: h,e,r
    Characteristics: lower case. Color blue. Underlined.
    Line Breaks: 0
    Blank spaces: 0
    Set Name: ArialL(L for link)

This example shows that only three image sets need to be created as image set one and three are identical. If letters are present in sets one and three, such as o, r, a, e and t, these letters are created just once as images and in the same final image set. Hence different text sections in the final email message may refer to the same image set.

The analysis component 220 passes control to the generator component 230 and the generator component 230 generates each of the identified characters with its associated characteristics and the number of required blank images to represent the blank spaces between each of the words (step 410). The generator component 230 places each of the generated character images in an image library file and assigns it a unique identifier in order for the replacement function to be able to call each of the image library files for viewing on the recipient's computer system. The generator component 230 also generates the replacement instructions that are used at the destination system for replacing each individual character in the email message with its corresponding generated character image and the required blank spaces (step 415). The converter component 225 next (or in parallel with the generation of the character image libraries by the generator component 230) converts the original email message from a rich text format to an HTML format (step 420). The converter component 225, using HTML, specifies the structure and the format of the original email message; i.e. the background color of the email message, any background images and each of the HTML tags for the original text. The converter component 225 also includes an 'convertToHTML.js' link which calls a JavaScript function that loads each of the generated image files and places it in the correct position within the HTML format. The HTML document includes a 'convert to HTML script', that parses the email message 210 and converts the email message from its rich text format to the HTML version. The HTML version specifies the structure and format of the email message, for example, the background color of the email message and any class attributes. Other structures and formats may comprise table layouts etc. The converter component 225 also places an 'onload function' which is read by the recipient's email software to initiate rendering using the replacement instructions.

The converted email message, the generated character image libraries and the replacement instructions are communicated to the transmit component for sending to the recipient for viewing (step 425).

Figure 5:
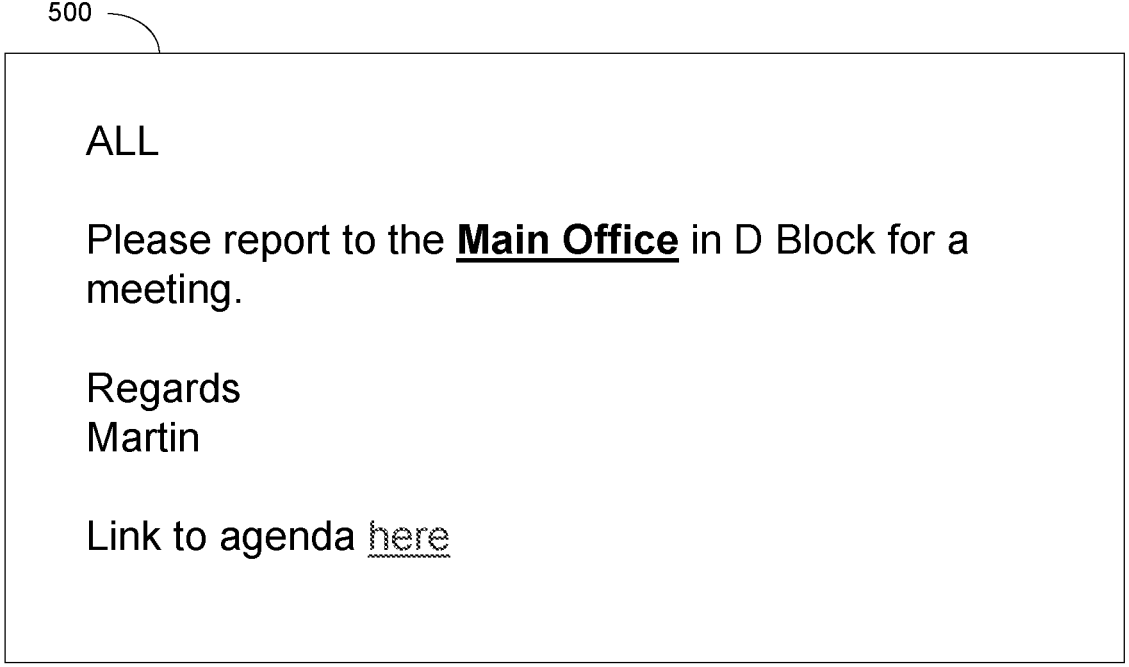
FIG. 5 illustrates the email of FIG. 3 converted into its image-based equivalent in accordance with a preferred embodiment of the present invention.

Moving on to FIG. 5, the converted email message of FIG. 3 is shown wherein each character of the email message is replaced by an image character generated by the generator component 230.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. An email message generator comprising:
   a receiving component for receiving message data for generating an email message to be addressed to a user at a destination system;
   an analysis component for analyzing the received message data to identify one or more sections of the received message data, each section consisting of characters having the same formatting characteristic;
   a converter component for converting the message data to a platform-independent format;
   a generating component for generating
      an image set comprising character images having a single formatting characteristic found in one or more of the identified sections of the message data, and
      a set of replacement instructions for use at the destination system to render the message by replacing each character specified in the platform-independent format with a character image retrieved from one of the image sets; and
   a transmitting component for sending said email message including said image set and set of replacement instructions to said destination system, wherein the analysis component further comprises a component for identifying a lowest common denominator of identified characters in the message data for use in generating character images by the generating component.

2. An email message generator according to claim 1 wherein the analysis component further comprises a component for determining a number of blank spaces in the email message to be replaced with a generated blank image.

3. A method for generating an email message comprising:
   receiving message data for generating an email message addressed to a user at a destination system;
   analyzing the message data to identify one or more sections of the received message data, each section consisting of characters having the same formatting characteristic;
   converting the message data to a platform-independent format;
   generating an image set comprising character images having a single formatting characteristic found in one or more of the identified sections of the message data, and
   generating a set of replacement instructions for use at the destination system to render the message by replacing each character specified in the platform-independent format with a character image retrieved from one of the image sets;
   generating an email message addressed to said user at said destination system, said message comprising said message data in platform-independent format, said image set and said set of replacement instructions; and
   identifying a lowest common denominator of identified characters in the message data for use in generating character images for said image set.

4. A method according to claim 3 wherein analyzing the message data to identify one or more sections, each section consisting of characters having the same formatting characteristic further comprises determining a number of blank spaces in the email message for replacement with a generated blank image.

5. A method according to claim 4 further comprising transmitting the generated image set, the blank image, the set of replacement instructions and the platform-independent format to the destination system.

6. A computer program product for generating an email message, said computer program product comprising a computer usable memory having computer usable program code embodied therewith, said computer usable program code comprising:
   computer usable program code configured to receive message data for generating an email message addressed to a user at a destination system;
   computer usable program code configured to analyze the received message data to identify one or more sections of the received message data, each section consisting of characters having the same formatting characteristic;
   computer usable program code configured to convert the message data to a platform-independent format;
   computer usable program code configured to generate an image set comprising character images having a single formatting characteristic found in one or more of the identified sections,
   computer usable program code configured to generate a set of replacement instructions for use at the destination system to render the message by replacing each character specified in the platform-independent format with a character image retrieved from one of the image sets; and
   computer usable program code configured to identify a lowest common denominator of identified characters in the message data for use in generating character images.

7. A computer program product according to claim 6 wherein the computer usable program code configured to analyze the message data to identify one or more sections further comprises computer usable program code configured to determine a number of blank spaces in the email message for replacement with a generated blank image.

8. A computer program product according to claim 7 further comprising computer usable program code configured to transmit the generated image set, the blank image, the set of replacement instructions and the platform-independent format to the destination system.

9. An email message generator comprising a computer programmed to generate and transmit email messages over a data network, said email message generator comprising:
   an analysis component for analyzing an outgoing email message in rich text format to identify one or more sections consisting of characters having a same formatting characteristic;
   a converter component for converting the email message from said rich text format to a platform-independent format;
   a generating component for generating
      one or more character images for characters found in said outgoing email message, and
      a set of replacement instructions for use at a destination system to render the email message by replacing characters specified in the platform-independent format with a corresponding character image from said character images; and
   a transmitting component for transmitting said outgoing email message to said destination system along with said one or more character images and said set of replacement instructions, wherein the analysis component further comprises a component for identifying a lowest common denominator of identified characters in the message data for use in generating character images by the generating component.

10. The email message generator of claim 9, wherein said platform-independent format is Hyper-Text Markup Language (HTML).

11. A method of generating email messages with a computer programmed to generate and transmit email messages over a data network, said method comprising:
   analyzing an outgoing email message in rich text format to identify one or more sections consisting of characters having a same formatting characteristic;
   converting the email message from said rich text format to a platform-independent format;
   generating
      one or more character images for characters found in said outgoing email message, and
      a set of replacement instructions for use at a destination system to render the email message by replacing characters specified in the platform-independent format with a corresponding character image from said character images;
   transmitting said outgoing email message to said destination system along with said one or more character images and said set of replacement instructions; and
   identifying a lowest common denominator of identified characters in the message data for use in generating character images for said image set.

12. The method of claim 11, wherein said platform-independent format is Hyper-Text Markup Language (HTML).

13. The method of claim 11, further comprising, at said destination system, rendering said email message by selectively replacing at least one character in said message with a corresponding character image in accordance with said replacement instructions.

14. The email message generator of claim 9, wherein each character image comprises formatting and stylization for a specific character such that multiple character images for a same character are generated if that character is to be presented in the email message with more than one formatting and stylization.

15. The email message generator of claim 9, wherein the generating component is selectively activated for an outgoing email message by selection of an option in a menu of the email message generator.

16. The email message generator of claim 9, wherein the set of replacement instructions instruct the destination system use a same character image to replace a same character at multiple locations within said email message.

17. The email message generator of claim 9, wherein said converter component places an onload function in the outgoing email message that, when read by the destination system, causes the destination system to initiate rendering of said email message according to said set of replacement instructions.

* * * * *